No. 801,243. PATENTED OCT. 10, 1905.
F. HOLDEN.
ELECTRIC MEASURING INSTRUMENT.
APPLICATION FILED JAN. 2, 1904.

3 SHEETS—SHEET 1.

Witnesses:

Inventor,
Frank Holden.
by Alb... Davis
Att'y.

No. 801,243. PATENTED OCT. 10, 1905.
F. HOLDEN.
ELECTRIC MEASURING INSTRUMENT.
APPLICATION FILED JAN. 2, 1904.

Witnesses.

Inventor.
Frank Holden.
by Albert G. Davis
Atty.

No. 801,243. PATENTED OCT. 10, 1905.
F. HOLDEN.
ELECTRIC MEASURING INSTRUMENT.
APPLICATION FILED JAN. 2, 1904.

3 SHEETS—SHEET 3.

Witnesses
George A. Thornton
Allen A. Ford

Inventor
Frank Holden
by Albert A. Davis
Att'y

UNITED STATES PATENT OFFICE.

FRANK HOLDEN, OF RUGBY, ENGLAND, ASSIGNOR TO GENERAL ELECTRIC COMPANY, A CORPORATION OF NEW YORK.

ELECTRIC MEASURING INSTRUMENT.

No. 801,243.     Specification of Letters Patent.     Patented Oct. 10, 1905.

Application filed January 2, 1904. Serial No. 187,455.

*To all whom it may concern:*

Be it known that I, FRANK HOLDEN, a citizen of the United States, residing at Rugby, in the county of Warwick, England, have invented certain new and useful Improvements in and Relating to Electric Measuring Instruments, of which the following is a specification.

My invention relates to electric measuring instruments of the electrodynamometer type, and more particularly to the construction of the fixed current coils or windings of astatic wattmeters, such as are used for the measurement of large amounts of electric energy. In measuring instruments of this kind the current-winding usually consists of a straight bar connecting a pair of terminals, and two moving coils are employed. These coils are mounted on a spindle passing through the bar and are situated at right angles to each other on opposite sides of the bar. With such an arrangement the field acting to produce movement at low loads is comparatively weak unless the current density in the bar be made high, in which case the temperature of the bar is largely increased at high loads and the voltage drop from this cause becomes excessive. This disadvantage may to some degree be avoided, for example, by the employment of a coil in which the conductor is bent so as to make a complete turn; but the formation of such coils from heavy conductors is difficult and expensive; and it is the object of my invention to overcome these objections and to provide an improved coil which can be easily constructed and which enables the force acting upon the moving coils at low loads to be largely increased, thereby producing a more sensitive and accurate instrument than heretofore.

Figure 1:
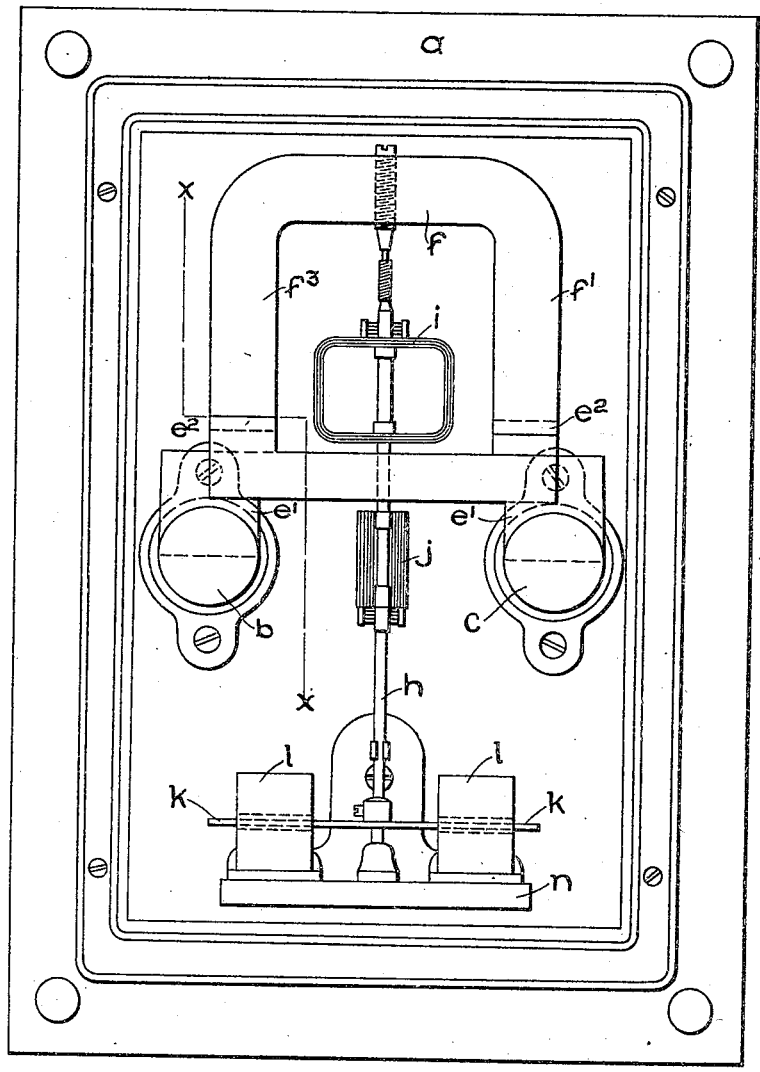
Figure 2:
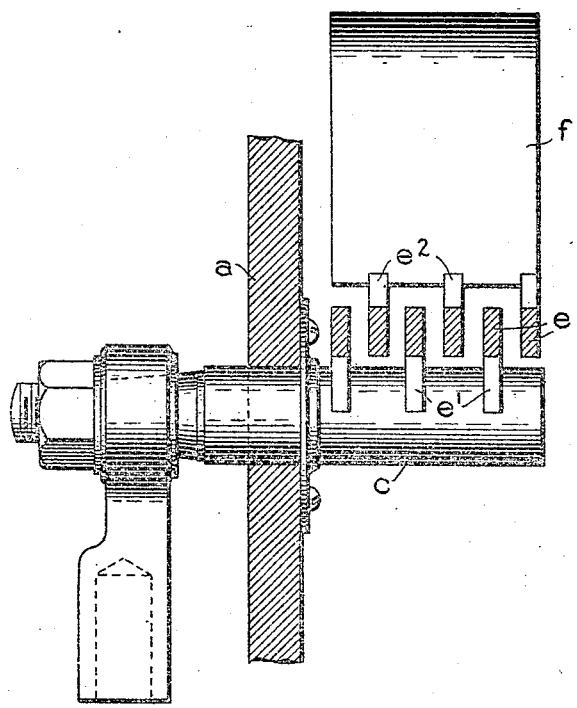
Figure 3:
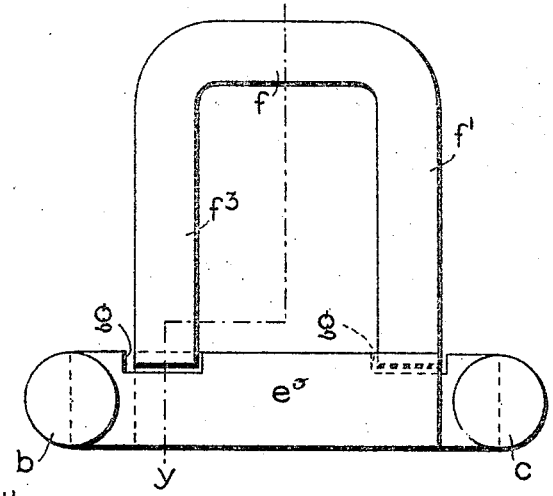
Figure 4:
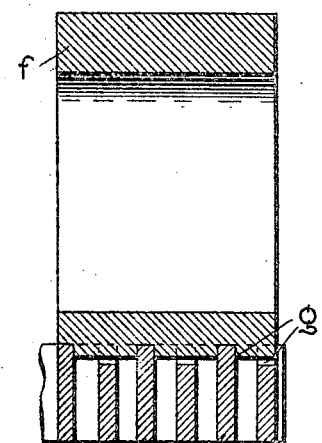
Figure 5:
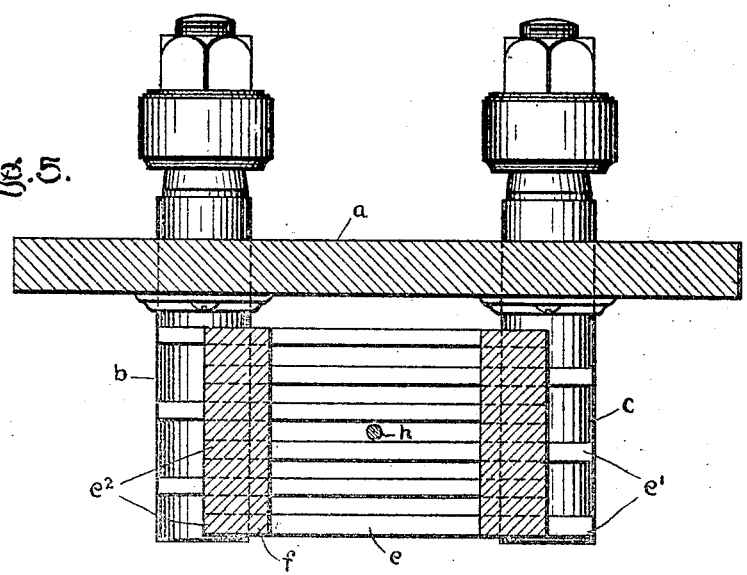
Figure 6:
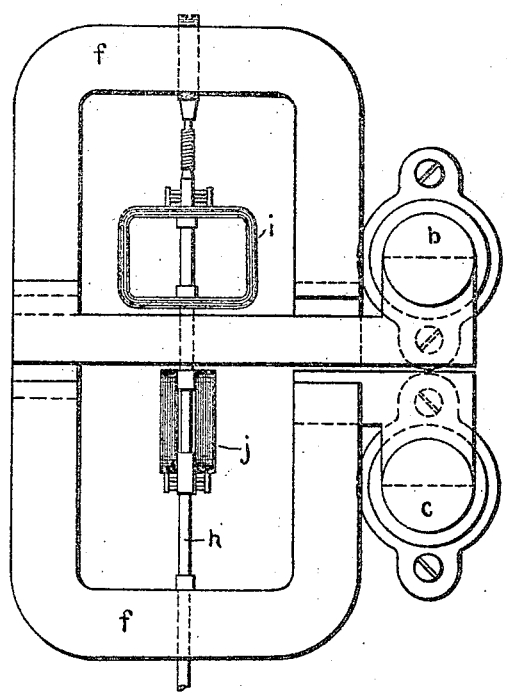

In the accompanying drawings, which illustrate my invention applied to a "Thomson" watt-hour meter, Figure 1 is a front elevation of a meter fitted with one form of my improved coil. Fig. 2 is a section of the current-coil on the line $x$ $x$ of Fig. 1. Fig. 3 shows in elevation a modified form of coil. Fig. 4 is a section of the coil on the line $y$ $y$ of Fig. 3. Fig. 5 is a horizontal sectional view above the bars $e$ of Fig. 2, and Fig. 6 is a front elevation of a further modification.

Referring to Fig. 1, $a$ is an insulating baseboard from the front of which projects, parallel to each other, a pair of terminals $b$ and $c$, provided with the usual back connections for coupling to the meter-circuit. In order to form the current-coil, I employ a number of sheet-stampings $e$, which are arranged on edge at suitable distances apart across the gap between the terminal posts. These stampings coöperate with a U-shaped closing block or loop $f$, so as to form a complete metallic circuit from the terminal $b$ to the terminal $c$ around the block $f$. This circuit may be formed by means of stampings of approximately Z shape connected to the block $f$ and to the terminals, as shown in Figs. 1, 2, and 5, or preferably these stampings may be constructed and connected as illustrated in Figs. 3 and 4.

Referring first to Figs. 1, 2, and 5, each alternate stamping $e$ is reversed with respect to its neighbor, and the end projections $e'$ on alternate stampings are soldered or otherwise secured into the terminals $b$ and $c$, respectively, while the upwardly-directed end projections $e^2$ are secured into the limbs $f'$ and $f^3$ of the closing-block $f$. At the extremities secured into the closing-block the stampings are insulated by air-spaces from the terminal posts, as shown clearly in Fig. 2.

In the construction of coil illustrated in Figs. 3 and 4 rectangular stampings $e^3$ are employed, and these stampings are arranged parallel to each other and separated by insulating-spaces, so that they extend partially across the gap between the terminal posts. Opposite extremities of alternate stampings are secured into the terminal posts $b$ and $c$, respectively, and the free extremities of said stampings are secured into the limbs of the U-shaped closing member $f$. In order to prevent short-circuiting of the whole of the stampings by the extremities of the closing-block, each stamping has a piece checked out of it adjacent to the terminal post to which it is secured, so as to form an insulating-space $g$ between it and the adjacent extremity of the block.

It will thus be seen that in both modifications of my invention above described I provide a complete metallic circuit from one terminal post through one set of stampings round the closing-block $f$ and through the remaining set of stampings to the other terminal post, the current-paths being in the same direction through all the stampings, thus producing a common field.

The spindle $h$ of the meter, Fig. 1, on which the moving coils *i* and *j*, forming the armature, are mounted, passes vertically downward between the stampings and has its upper bearing formed in the closing-block *f* of the coil, the lower bearing being formed in a bracket *n*, projecting horizontally from the base-board *a*. The spindle is fitted near its lower end with the usual brake-disk *k*, moving between the poles of fixed permanent magnets *l*.

The two coils *i* and *j* are mounted on the spindle *h* at right angles to each other, the coil *i* being situated within the current-coil just above the laminated portion of said coil, while the moving coil *j* is placed just below the laminated portion, so that both coils are directly under the influence of the field, due to the current in the stampings $e$ or $e^3$.

The registering mechanism of the meter (not shown) may be mounted on the closing-block *f* and geared directly with the meter-spindle *k* in the usual manner.

According to a modification of this invention where it is desired to provide a winding having a pair of loops inclosing both the movable coils of an astatic meter or other similar moving-coil instrument I arrange the terminals *b* and *c* alongside of each other in the same vertical plane and provide an additional U-shaped block which is placed in position so as to inclose the lower coil *j*. The stampings which in the form of coil described and illustrated were secured into the terminal post *b* are in this case fastened into the adjacent limb of the lower U-shaped block, the remaining limb being secured to the terminal *c*. There is thus formed a complete metallic circuit between the terminals *b* and *c*, which consists of a winding having the shape of the figure 8 inclosing both moving coils of the instrument.

In instruments constructed as above described the field acting on the movable coil is largely increased at low loads, owing to the uniform current distribution secured by the laminated portion of the current-coil and owing to the fact that it is possible to work with higher current density at high loads on account of the increased cooling effect due to the ventilating air-spaces between the laminæ of said coil. This form of coil can also be readily standardized for instruments of different ranges, thereby diminishing the cost of manufacture of the instruments.

What I claim as new, and desire to secure by Letters Patent of the United States, is—

1. In an electric meter of the motor type, two binding-posts and two sets of laminations of conducting material, one set connected at one end to one binding-post and the other set connected at one end to the other binding-post, said laminations carrying the field-current of the meter-motor.

2. In an electric meter of the motor type, two binding-posts and a plurality of similar laminations of conducting material, alternate laminations being connected to opposite binding-posts at one end, said laminations carrying the field-current of the meter-motor.

3. In an electric meter of the motor type, two binding-posts, two sets of laminations of conducting material, one set connected at one end to one binding-post and the other set connected at one end to the other binding-post, said laminations carrying the field-current of the meter-motor and an armature mounted for rotation in proximity to said laminations.

4. In an electric measuring instrument, two binding-posts, two sets of laminations of conducting material, the laminations of each set being connected at one end to one binding-post and conducting material connecting the other ends of the two sets of laminations.

5. In an electric measuring instrument, two binding-posts, a plurality of similar laminations of conducting material, alternate laminations being connected to opposite binding-posts at one end and conducting material connecting the other ends of the laminations.

6. In an electric measuring instrument, two binding-posts, two sets of similar laminations of conducting material, the laminations of each set being connected to opposite binding-posts at one end, and a member of conducting material to which the other ends of all the laminations are electrically connected.

7. In an electric measuring instrument, two binding-posts, two sets of laminations of conducting material, and a U-shaped member of conducting material, one set of laminations being connected between one binding-post and one end of said member and the other set being connected between the other binding-post and the other end of said member.

8. In an electric measuring instrument, two binding-posts, two sets of laminations of conducting material, the laminations of the two sets being connected at one end to opposite binding-posts, a member of conducting material to which the other ends of all the laminations are electrically connected, and a moving element mounted in proximity to the laminations and said member.

9. In an electric measuring instrument, two binding-posts, a plurality of similar laminations of conducting material, alternate laminations being connected to opposite binding-posts at one end, a U-shaped member of conducting material to which the other ends of all the laminations are electrically connected, and an armature mounted for rotation within the loop formed by the laminations and said member.

In witness whereof I have hereunto set my hand this 15th day of December, 1903.

FRANK HOLDEN.

Witnesses:
 R. WESTACOTT,
 ALFRED NUTTING.